Nov. 20, 1962     H. J. VOGT     3,065,280
PRODUCTION OF METHYLCHLOROFORM
Filed Sept. 19, 1960
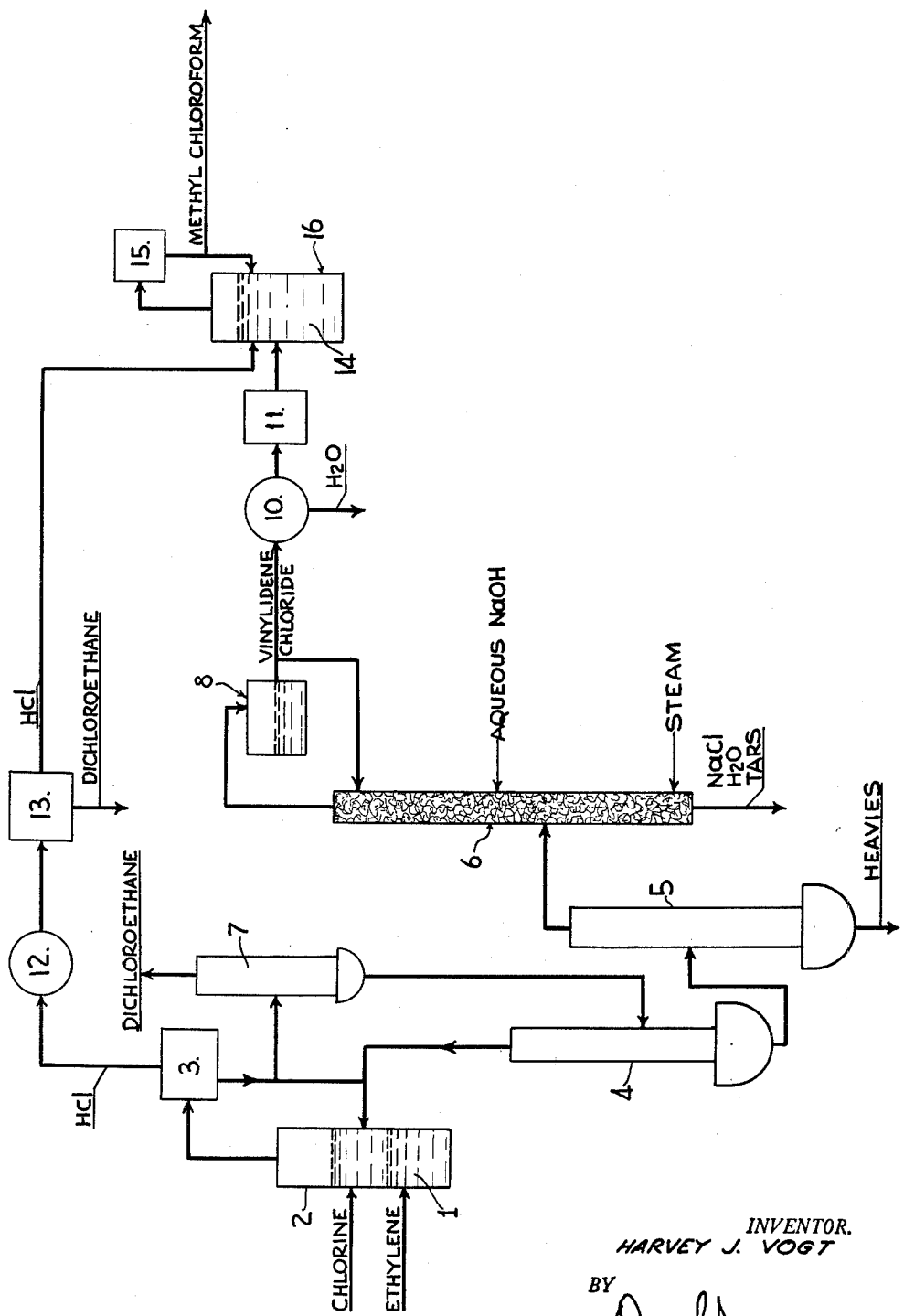
INVENTOR.
HARVEY J. VOGT
BY *Oscar L. Spencer*
ATTORNEY

United States Patent Office 3,065,280
Patented Nov. 20, 1962

3,065,280
PRODUCTION OF METHYL CHLOROFORM
Harvey J. Vogt, Pittsburgh, Pa., assignor, by mesne assignments, to Pittsburgh Plate Glass Company
Filed Sept. 19, 1960, Ser. No. 56,941
6 Claims. (Cl. 260—659)

This invention concerns the manufacture of methylchloroform (1,1,1-trichloroethane). It more particularly involves producing methylchloroform from ethylene and chlorine.

Manufacture of methylchloroform from ethylene and elemental chlorine is achieved in accordance with this invention by a unique sequence of interrelated steps including (a) chlorinating ethylene (or 1,2-dichloroethane) with elemental chlorine to form 1,1,2-trichloroethane and evolve hydrogen chloride, (b) dehydrochlorinating this 1,1,2-trichloroethane to form vinylidene chloride (1,1-dichloroethene) and (c) reacting this vinylidene chloride and hydrogen chloride evolved in step (a) to form methylchloroform. In terms of chemical equations, these steps and their interrelationship may be expressed as:

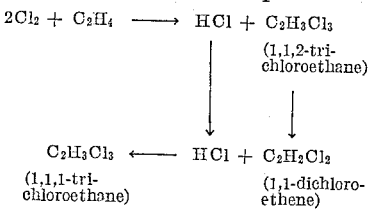

$$2Cl_2 + C_2H_4 \longrightarrow HCl + C_2H_3Cl_3$$
(1,1,2-trichloroethane)

$$C_2H_3Cl_3 \longleftarrow HCl + C_2H_2Cl_2$$
(1,1,1-trichloroethane)     (1,1-dichloroethene)

Hydrogen chloride and vinylidene chloride necessary for the preparation of methylchloroform are generated from steps of the contemplated process.

In this process, the consumption of chlorine is minimized. Theoretically, some 75 percent of the chlorine required by the process is recovered as product, e.g., methylchloroform. Since the yields in each step of the process are high, often approaching theoretical, methylchloroform is here realized most efficiently from elemental chlorine. Burdensome coproduction of relatively undesirable hydrogen chloride, a by-product in the production of many chlorohydrocarbons, is circumvented.

The provision of 1,1,2-trichloroethane for the purposes of this invention is best accomplished by the reaction of ethylene or 1,2-dichloroethane and elemental chlorine in a liquid reaction medium of the dichloroethane which contains in appropriate concentration a recognized catalyst such as ferric chloride. An ideal procedure involves feeding chlorine and ethylene to a substantially anhydrous catalyst contained in a liquid body of chlorinated ethanes, principally 1,2-dichloroethane, while concurrently vaporizing 1,2-dichloroethane from the liquid body. Thus, trichloroethane is formed at the expense of chlorine and ethylene in the liquid body while conditions are such that there is evolution of gaseous dichloroethane. Along with dichloroethane, hydrogen chloride, lower boiling components and some trichloroethane are evolved.

Depending, among other things, upon the specific composition of the liquid body, these conditions vary. For example, with a liquid body having a low 1,1,2-trichloroethane concentration (e.g., about 5 weight percent or less) the temperature of the liquid body is maintained at approximately the boiling point (under the prevailing pressure) of 1,2-dichloroethane, notably at about 83° C. at atmospheric pressure.

The heat of vaporization, especially of the dichloroethane, facilitates the temperature control, the chlorination being exothermic, and the evolved gases are withdrawn from the reaction zone and cooled to condense organics and primarily 1,2-dichloroethane. Usually, the hydrogen chloride remains uncondensed. A portion or all of the 1,2-dichloroethane may be recycled to the liquid body to supplement further temperature regulation of the reaction medium. When the chlorination is conducted principally for the purpose of providing trichloroethane, essentially all this dichloroethane is returned to the liquid body. If desired, any evolved trichloroethane may be separated and employed as part or all of the trichloroethane eventually transformed into methylchloroform in accordance with further steps hereinafter described.

In a typical chlorination directed primarily to providing 1,1,2-trichloroethane, approximately two moles of chlorine (about 1.8 to 2.05 moles) per mole of ethylene are fed to a liquid body of 1,2-dichloroethane in which an appreciable 1,1,2-trichloroethane concentration is maintained. Essentially all organics volatilized from the body are returned, usually as liquid, and trichloroethane is recovered by withdrawing periodically or continuously a liquid stream from which the trichloroethane is separated. Dichloroethane in this withdrawn stream is returned to the reactor.

If desired, this chlorination readily lends itself to the simultaneous preparation from ethylene of 1,2-dichloroethane and 1,1,2-trichloroethane. For such joint production of the chlorinated ethanes, more than one mole (usually 1.2 to 1.5 moles) of chlorine but less than 1.8 moles of chlorine per mole of ethylene are fed to the liquid body reaction medium. The liquid body is maintained boiling by virtue of the exothermic nature of the reaction or reactions. At superatmospheric pressures, the temperatures will be higher. As a consequence of the overall exothermic nature of the reactions taking place in the liquid body, 1,2-dichloroethane and other lower boiling constituents are constantly evolved from the reaction medium as a gaseous mixture.

Thus, in the continuous reaction of chlorine and ethylene to produce both 1,2-dichloroethane and trichloroethane, a gaseous mixture including ethylene dichloride, trichloroethane and lower boiling components such as hydrogen chloride are continuously evolved from the liquid reaction medium. The heat of vaporization assists in removing the heat of reaction and thus maintains the liquid medium at appropriate reaction temperatures. The gaseous mixture is withdrawn from direct contact with the liquid reaction medium and is cooled to condense organics (e.g., chlorinated hydrocarbons) thus separating hydrogen chloride from the chlorinated hydrocarbons. A portion but not all of the 1,2-dichloroethane is returned as liquid to the reactor. The trichloroethane evolved as gas may be returned to the liquid body according to one embodiment. In another, this trichloroethane is separated and sent forward in this method for the production of methylchloroform.

Trichloroethane and other constituents boiling substantially above the temperature of the liquid reaction medium tend to concentrate in the liquid reaction medium if evolved trichloroethane is recycled. In this case, it is preferable to remove a portion of the liquid body periodically or continuously, usually from a lower level in the liquid reaction medium, as the principal means for removing product trichloroethane from the reaction medium. Alternatively or in conjunction with this particular procedure, trichloroethane may be evolved with and separated from dichloroethane.

The ratio in which dichloroethane and trichloroethane are produced may be controlled by the (1) ratio in which ethylene and chlorine are fed to the reaction zone and (2) the concentration of metal chloride catalyst, notably anhydrous ferric chloride, which is maintained in the reaction medium. Typically, chlorine and ethylene are fed in the mole ratio of above one but below two moles of chlorine per mole of ethylene, ideally about 1.2 to 1.8 moles of chlorine per mole of ethylene. Ferric chloride concentrations range upwardly from 0.005 percent by weight with the lower ferric chloride concentrations favoring the production of trichloroethane.

The trichloroethane product stream separated from the reaction medium may include higher chlorinated ethanes such as tetrachloroethane and usually contains considerable dichloroethane.

For the purpose of this invention, substantially pure 1,1,2-trichloroethane is desired. Thus, the 1,1,2-trichloroethane is ideally substantially free of 1,2-dichloroethane and at most contains inconsequential amounts of other chlorinated components. Recourse to fractionation procedures is suitable.

While the foregoing has described the simultaneous preparation of 1,2-dichloroethane and 1,1,2-trichloroethane from ethylene and chlorine, 1,2-dichloroethane may be used in lieu of ethylene.

This 1,1,2-trichloroethane is then dehydrochlorinated to produce vinylidene chloride. For best results, trichloroethane is dehydrochlorinated with aqueous inorganic alkali oxide or hydroxide, notably strong alkali typified by alkali metal hydroxide such as sodium hydroxide, potassium hydroxide and alkaline earth metal hydroxide such as calcium hydroxide. Theoretically, one mole equivalent of alkali metal hydroxide is required for the dehydrochlorination of trichloroethane to vinylidene chloride. Thus, in the dehydrochlorination step, approximately one mole of sodium hydroxide is consumed per mole of formed vinylidene chloride. The reagents are charged in amounts corresponding to the stoichiometric requirement with some excess (e.g., 2 to 10 mole percent excess) of the alkali metal hydroxide being preferable.

The temperatures for the dehydrochlorination are usually moderate and consistent with conducting the dehydrochlorination in an aqueous liquid alkaline medium, e.g., in the range of 10° C. to 85° C.

After separating vinylidene chloride from the reaction medium in which it is produced, it is reacted with hydrogen chloride evolved in the production of trichloroethane by chlorination.

The reaction of hydrogen chloride and vinylidene chloride to form methylchloroform is conducted ideally by liquid phase reaction in a medium provided by an inert organic solvent, usually methylchloroform. The presence in the liquid reaction medium of a catalyst in suitable catalytic concentration is desirable. As a rule, the conventional hydrochlorination catalysts, notably metal chlorides such as ferric chloride, are employed in a typical catalytic concentration between 0.01 and 1.0 percent by weight in the reaction medium.

Typically, equimolecular amounts of vinylidene chloride and hydrogen chloride (both of which are preferably anhydrous) are fed into a substantially anhydrous liquid body comprised principally of methylchloroform containing catalytic concentrations of a hydrochlorination catalyst, notably ferric chloride. Preferably, the reaction medium is maintained at temperatures between 10° C. and 80° C. when operating under ambient atmospheric conditions. Subatmospheric conditions are useful, especially when it is desirable to conduct the hydrochlorinations below the normal boiling point of methylchloroform.

Hydrochlorination of vinylidene chloride may be conducted in a liquid body of methylchloroform from which methylchloroform is vaporized. Condensation of such vapors serves as the means for removing product from the reaction zone.

When the liquid body is substantially methylchloroform, the reaction is performed in a body of boiling methylchloroform preferably at subatmospheric pressure so that the temperature of the boiling liquid is below about 60° C. By withdrawing the methylchloroform from the reactor as a vapor, the product is of goodly purity and substantially free of metal chloride catalyst. Once withdrawn from the reaction zone, gaseous methylchloroform is condensed by cooling substantially below the normal boiling point of methylchloroform, such as cooling to 25° C. If desirable, a portion of this condensed methylchloroform may be recycled to the reactor for the purpose of maintaining essentially constant the liquid reaction medium volume. The balance or all of the methylchloroform may be further purified, for example, to remove any dissolved hydrogen chloride and forwarded to further processing steps including drying and stabilizing.

By reference to the flow sheet comprising the drawing, particular embodiments of the present invention may be illustrated.

Elemental chlorine (either gaseous or liquid) and ethylene are fed into reactor 2 beneath the upper level of substantially anhydrous liquid body 1 comprised mainly (usually at least 75 weight percent) of 1,2-dichloroethane and containing notably 0.06 percent ferric chloride by weight. The liquid body is maintained at a temperature corresponding to the normal boiling point of ethylene dichloride or the therein prevailing ethylene dichloride-trichloroethane mixture with atmospheric pressure conditions. Under these conditions, the exothermic nature of the process is such that liquid body 1 is maintained boiling. Sufficient chlorine is fed so that a portion of the ethylene dichloride which is produced by the additive chlorination is further chlorinated to 1,1,2-trichloroethane by substitution chlorination. Typically, 1.1 to 2.0 moles of chlorine per mole of ethylene is charged in this manner. Such higher chlorinated ethanes such as tetrachloroethane and possibly pentachloroethane are also produced, but usually in minor concentrations, especially if the 1,1,2-trichloroethane concentration in the liquid body is kept below about 25 weight percent.

Removed from the reaction zone of reactor 2 is a gaseous mixture comprising principally 1,2-dichloroethane, 1,1,2-trichloroethane and hydrogen chloride. The amount of hydrogen chloride evolved and removed from reactor 2 corresponds approximately on a mole basis to the amount of trichloroethane produced, some excess hydrogen chloride evolving as a consequence of the production of the minor amounts of ethanes more highly chlorinated than trichloroethane. This gas stream is cooled in condenser 3 to about 25° C., thus condensing substantially all of the dichloroethane while the hydrogen chloride remains as a gas.

A portion of the condensed dichloroethane is recycled to reactor 2 to maintain an essentially constant volume of liquid reaction medium therein and to assist in temperature control. The balance is purified in still 7 to provide an overhead of essentially pure dichloroethane.

From the bottom of this still 7, an organic stream containing a high 1,1,2-trichloroethane concentration is withdrawn and set forward to column 4. Alternatively, trichloroethane may be obtained by removing a portion of the liquid body and separating therefrom its trichloroethane content; usually it contains no more than 25 percent by weight trichloroethane. In column 4, constituents boiling below the normal boiling point of 1,1,2-trichloroethane (mainly 1,2-dichloroethane) are removed as overhead. They may be recycled to any dichloroethane stream in the process, but usually are returned to the reactor as indicated in the drawing. From the bottom of column 4, a trichloroethane product stream substantially free of components boiling below 1,1,2-trichloroethane is forwarded to column 5. In this column, trichloroethane is separated in highly pure state from higher boiling components such as tetrachloroethane. The heavies or bottoms from column 5 comprising mainly tetrachloroethane and possibly some pentachloroethane and hexachloroethane are removed from the system.

The overhead stream of purified 1,1,2-trichloroethane is forwarded to dehydrochlorinator 6 where it is mixed with aqueous sodium hydroxide. To avoid the possibility of undue polymerization of vinylidene chloride in dehydrochlorinator 6, the system is maintained substantially free of oxygen and small amounts of stabilizers such as phenol are added to the vinylidene chloride, especially if it is stored for an appreciable time. Typically, 0.1 to 1.0 percent phenol by weight of the vinylidene chloride is added. The prevailing conditions of temperature and pressure in dehydrochlorinator 6 are such that the gas stream emanating from the upper section of dehydrochlorinator 6 comprises a gaseous mixture of vinylidene chloride and water vapor substantially free of organic contaminants. Such gaseous mixture, after being withdrawn, is cooled in condenser 8. To accomplish product removal in this fashion, live steam is fed into a lower portion of dehydrochlorinator 6. Thus, the lower portion of dehydrochlorinator 6 serves as a stripping section while the upper portion functions as a reflux section. Sodium chloride, water and high boiling organic chlorides (tars) are withdrawn from the bottom of this stripping section.

The overhead gases from dehydrochlorinator 6 are liquefied by cooling in condenser 8 (any water being phase separated and recycled to the dehydrochlorinator). The organic phase is cooled further to about 1° C. to 10° C. with additional water being separated in unit 10. Additional drying of vinylidene chloride is achieved by the molecular sieves 11 or other solid desiccants to provide vinylidene chloride containing less than 400 parts and often less than 100 parts per million by weight of water.

This dried vinylidene chloride is then forwarded to hydrochlorinator 16 for reaction with hydrogen chloride evolved in the chlorination conducted in reactor 2.

Typically, the hydrogen chloride gas stream separated from dichloroethane in condenser 3 is in compressor 12 raised to a superatmospheric pressure of about 200 pounds per square inch gauge and in cooler 13 reduced in temperature to about 1° C. to 5° C. Nearly all the dichloroethane accompanying the hydrogen chloride condenses and is separated. This dichloroethane may be combined with any crude dichloroethane stream in the system either for recycle to chlorinator 2 or to crude dichloroethane stream and sent forward for such purification as is necessary.

If necessary, the hydrogen chloride gas stream leaving cooler 13 may be even further freed of trace amounts of organics such as dichloroethane by scrubbing under superatmospheric pressures such as 200 pounds per square inch gauge with the polychlorinated ethanes comprising the heavies from column 5.

The hydrogen chloride gas so purified is then forwarded to hydrochlorinator 16 for reaction with vinylidene chloride. Typically, both the vinylidene chloride and hydrogen chloride are fed in essentially equimolecular proportions to hydrochlorinator 16 below the liquid-gas interface present therein. Liquid body 14 is comprised mainly of methylchloroform alone or in admixture with vinylidene chloride as a boiling liquid body. A small amount of appropriate catalyst such as ferric chloride is present. A typical catalyst concentration is from 0.1 to 2.0 percent ferric chloride by weight of the liquid body. With the liquid body 14 maintained at boiling, usually at approximately the normal boiling point of methylchloroform or the prevailing methylchloroform-vinylidene chloride mixture under substantially atmospheric pressure, methylchloroform is recovered as an overhead gas stream which is forwarded and completely liquefied in condenser 15 by cooling to 25° C. This condensate may then be further purified as required or a portion may be recycled to hydrochlorinator 16 to maintain an essentially constant liquid volume therein.

A variety of expedients may be relied upon to purify further methylchloroform obtained as condensate from condenser 15. This condensed methylchloroform may contain dissolved hydrogen chloride and often some vinylidene chloride. This may be stripped from methylchloroform and recycled. Such stripping may be conducted so as to remove methylchloroform as a vapor. Minor or residual traces of hydrogen chloride may be removed by treatment of the methylchloroform with inorganic alkali such as ammonia and water. The resulting methylchloroform is then preferably stabilized, stored or packaged for sale or use.

The following example illustrates a specific method by which the present invention may be practiced:

*Example*

As diagrammatically shown in the drawing, the process for producing methylchloroform entails first feeding 192.67 pounds per hour of elemental gaseous chlorine and 71.81 pounds per hour of ethylene (98 mole percent ethylene purity) to liquid body 1 in reactor 2 maintained at about 84° C. This liquid body comprises 1,2-dichloroethane with about 8.4 weight per cent trichloroethane and 0.06 weight percent ferric chloride. With the liquid body boiling and hence evolving vapors principally comprised of 1,2-dichloroethane and hydrogen chloride, both dichloroethane and trichloroethane are produced with their heats of reaction maintaining the liquid reaction temperature.

These vapors are cooled to condense their organic content in condenser 3, a portion of the liquid organic being recycled to reactor 2. The balance is forwarded to still 7 where 1,2-dichloroethane at the rate of 236.16 pounds per hour is removed as overhead, condensed and stored for further use. Removed from the bottom of still 7 and fed to still 4 is a liquid stream containing per hour 1.15 pounds 1,2-dichloroethane, 19.52 pounds 1,1,2-trichloroethane, 1.80 pounds tetrachloroethane and 0.52 pound pentachloroethane.

Essentially all the 1,2-dichloroethane fed to still 4 is separated along with some 0.06 pound per hour of trichloroethane in the overhead stream which is recycled to the reactor 1. The balance of the feed is withdrawn as liquid from the bottom of still 4 and forwarded to column 5 where essentially pure 1,1,2-trichloroethane (19.39 pounds per hour and a trace of tetrachloroethane) is separated overhead and forwarded to dehydrochlorinator 6 along with an aqueous solution containing 10.5 weight per cent NaOH and 14.5 weight percent NACl fed at a rate of 6.39 pounds per hour NaOH. Steam is introduced into the lower portion of the column. Temperatures in dehydrochlorinator 6 range from 115° C. at the bottom downwardly to about 33° C. at the top. Sodium chloride, water and some tars are removed from the bottom of the hydrochlorinator.

Overhead, the vinylidene chloride is separated, liquefied by cooling and dried, thus providing 13.44 pounds per hour of essentially pure vinylidene chloride and fed to hydrochlorinator 16.

Also fed to hydrochlorinator 16 is a portion of the hydrogen chloride which is generated in reactor 2 at the rate of 8.38 pounds per hour. After being withdrawn from reactor 2 as a gas, this hydrogen chloride is simultaneously cooled to −35° C. and compressed to 200 pounds per square inch gauge. As a consequence, about 95 weight percent of the 1,2-dichloroethane and almost all the trichloroethane present in the hydrogen chloride condense and are phase separated.

A portion of the hydrogen chloride is vented and then further purified by scrubbing with the liquid organics removed from the bottom of column 5, thus insuring a hydrogen chloride stream essentially free of 1,2-dichloroethane. In such purified state, 5.30 pounds per hour of hydrogen chloride is fed to hydrochlorinator 16 where it is reacted with the vinylidene chloride to form methylchloroform.

The hydrochlorination is conducted in a liquid body of methylchloroform containing 0.3 weight percent ferric chloride. Some 0.09 pound per hour of ferric chloride is added to maintain the specified catalyst concentration. Liquid body 14 is maintained at about 74° C. at its liquid-gas interface, or in other words, at about the normal boiling point of methylchloroform. Thus, methylchloroform is withdrawn as a gas stream, condensed and a portion separated at the rate of 17.51 pounds per hour methylchloroform as a product stream which is further purified and stabilized. The balance of the condensate is recycled to the reactor.

While the present invention has been described by reference to specific details of certain embodiments, it is not intended that the invention be construed as limited to such details except insofar as they appear in the appended claims:

I claim:

1. The method of producing methylchloroform which comprises simultaneously preparing 1,1,2-trichloroethane and hydrogen chloride by chlorination, separating the trichloroethane and hydrogen chloride, dehydrochlorinating separated trichloroethane to vinylidene chloride, and reacting such vinylidene chloride with hydrogen chloride obtained from the chlorination to produce methylchloroform.

2. The method of producing methylchloroform which comprises the steps of (a) chlorinating ethylene to provide 1,1,2-trichloroethane and hydrogen chloride, (b) separating 1,1,2-trichloroethane and hydrogen chloride, (c) dehydrochlorinating 1,1,2-trichloroethane separated in step (b) with aqueous alkali to produce vinylidene chloride and (d) hydrochlorinating vinylidene chloride with hydrogen chloride produced in step (a) to form methylchloroform.

3. The method of producing methylchloroform which comprises forming 1,1,2-trichloroethane and hydrogen chloride from ethylene and chlorine, separating trichloroethane from such hydrogen chloride, dehydrochlorinating such separated trichloroethane to form vinylidene chloride and hydrochlorinating such vinylidene chloride with hydrogen chloride formed with the trichloroethane to provide methylchloroform.

4. The method of producing methylchloroform which comprises chlorinating ethylene in the presence of 1,2-dichloroethane to form hydrogen chloride and 1,1,2-trichloroethane, separating hydrogen chloride from 1,1,2-trichloroethane, removing substantially all 1,2-dichloroethane from such 1,1,2-trichloroethane, dehydrochlorinating this trichloroethane to form vinylidene chloride and hydrochlorinating so-formed vinylidene chloride with hydrogen chloride evolved in said chlorination to produce methylchloroform.

5. The method of producting methylchloroform which comprises chlorinating ethylene in a liquid body of 1,2-dichloroethane to form hydrogen chloride and 1,1,2-trichloroethane, separating the hydrogen chloride and trichloroethane, removing substantially all 1,2-dichloroethane from so produced trichloroethane, dehydrochlorinating this purified trichloroethane to form vinylidene chloride and hydrochlorinating so formed vinylidene chloride with hydrogen chloride generated in said chlorination and from which substantially all dichloroethane has been removed whereby to form methylchloroform.

6. The method of producing methylchloroform which comprises the steps of (a) preparing 1,1,2-trichloroethane and hydrogen chloride co-products by chlorination, (b) separating 1,1,2-trichloroethane and hydrogen chloride, (c) dehydrochlorinating 1,1,2-trichloroethane separated in step (b) with aqueous alkali to produce vinylidene chloride, (d) freeing hydrogen chloride separated in step (b) substantially of organics and (e) hydrochlorinating vinylidene chloride with hydrogen chloride provided in step (d) to form methylchloroform.

References Cited in the file of this patent

UNITED STATES PATENTS

| | | |
|---|---|---|
| 2,209,000 | Nutting et al. | July 23, 1940 |
| 2,480,982 | Thurman et al. | Sept. 6, 1949 |
| 2,929,852 | Benedict | Mar. 22, 1960 |

FOREIGN PATENTS

| | | |
|---|---|---|
| 534,733 | Great Britain | Mar. 17, 1941 |
| 638,117 | Great Britain | May 31, 1950 |

UNITED STATES PATENT OFFICE
CERTIFICATE OF CORRECTION

Patent No. 3,065,280                      November 20, 1962

Harvey J. Vogt

It is hereby certified that error appears in the above numbered patent requiring correction and that the said Letters Patent should read as corrected below.

Column 4, line 31, for "Such" read -- Some --; line 55, for "set" read -- sent --.

Signed and sealed this 31st day of March 1964.

(SEAL)
Attest:
ERNEST W. SWIDER

Attesting Officer

EDWARD J. BRENNER

Commissioner of Patents